United States Patent [19]
Stripling et al.

[11] 3,878,730
[45] Apr. 22, 1975

[54] VENTED ROTOR GYROSCOPE

[75] Inventors: William W. Stripling; Aubrey Rodgers, both of Huntsville, Ala.

[73] Assignee: The United States of America as represented by the Secretary of the Army, Washington, D.C.

[22] Filed: Jan. 4, 1974

[21] Appl. No.: 430,960

[52] U.S. Cl. ............................. 74/5.7; 308/DIG. 1
[51] Int. Cl. ............................................. G01c 19/26
[58] Field of Search ............... 74/5.12, 5.6 A, 5.7; 308/DIG. 1, 9; 244/1 SA

[56] References Cited
UNITED STATES PATENTS

| | | | |
|---|---|---|---|
| 2,964,953 | 12/1960 | Conley et al. | 74/5.7 |
| 3,187,588 | 6/1965 | Parker | 74/5.7 X |
| 3,604,277 | 9/1971 | Stripling et al. | 74/5.7 |
| 3,610,053 | 10/1971 | Stripling et al. | 308/DIG. 1 |
| 3,726,572 | 4/1973 | Beardmore | 308/9 |

*Primary Examiner*—Manuel A. Antonakas
*Attorney, Agent, or Firm*—Robert P. Gibson; Nathan Edelberg

[57] ABSTRACT

The hydrostatic air bearing of a gyroscope for transportation machines such as missiles is liquid augmented to be effective at high (100+g) accelerations of the missile and the gyroscope rotor is provided with passages to vent the bearing for reduced viscous torques at gyroscope slow down.

1 Claim, 2 Drawing Figures

PATENTED APR 22 1975

3,878,730

VENTED ROTOR GYROSCOPE

BACKGROUND OF THE INVENTION

This application principally concerns transportation machines such as missiles that are tube or booster launched into trajectories with linear initial portions. The missiles are guided in the substantially six second initial portions by gyroscopes with rotors that are accelerated to 15,000 to 25,000 RPM and then permitted to coast. Launchings involve high (100+g) acceleration periods of the order of 25 milliseconds in which the normal air bearings of the rotors are insufficient to carry the load. The size of the missiles is insufficient to accommodate large supplies to increase the air pressure in the bearing during the periods of high acceleration.

Previous bi-fluid gyroscopes require expensive fluted bearings to develope high pressure in the bearing with normal air supplies and the gyroscopes also required increased power to develope higher rotor speeds to compensate for high viscous torques of the liquid tending to reduce the coasting speed of the rotor.

SUMMARY OF THE INVENTION

A gyroscope for directing a transportation machine in the linear portion of a path is disposed for initial excitation and subsequent coast periods. The gyroscope includes a spherically mated rotor and stator with the stator disposed to provide an air bearing therebetween and to replace the air with fluid for increased bearing capability during the stage of high missile acceleration, after which the bearing operates an air alone. The rotor is provided with passages to vent the fluid from the bearing and minimize viscous torques during the gyroscope coast period.

DESCRIPTION OF THE PREFERRED EMBODIMENT

Figure 1:
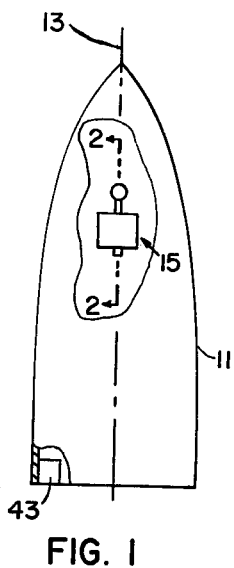
FIG. 1 is a missile 11 partly cut away to show gyroscope 15.
Figure 2:
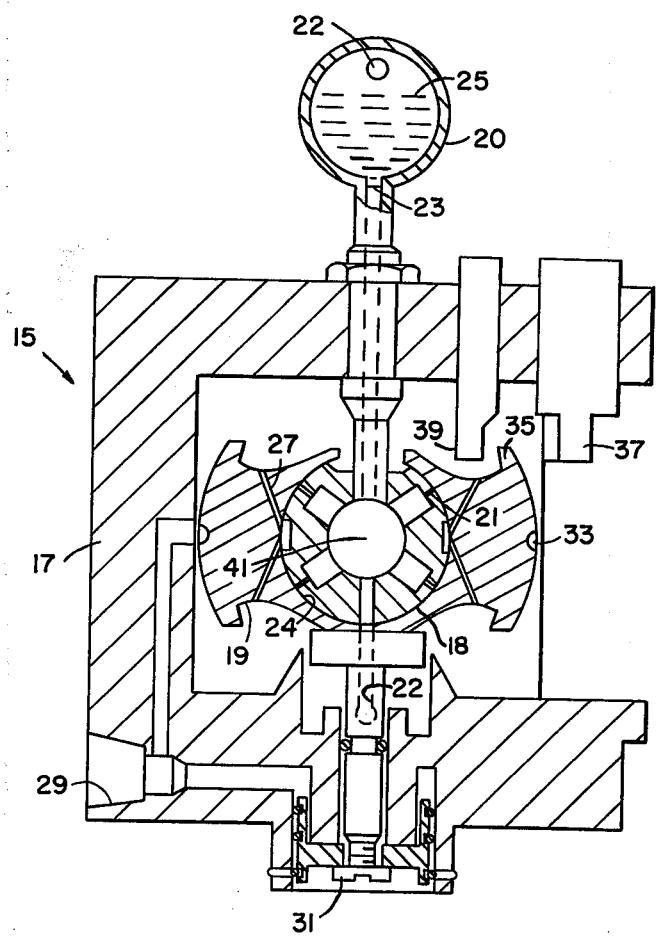
FIG. 2 is a view along 2—2 of FIG. 1.

A missile 11 with an axis 13 includes a gyroscope 15 with a stator 17 in coaxial relation with missile 11. Stator 17 is provided with a portion 18 spherically mated with a rotor 19 and stator 17 is also provided with radial passages 21 for compressed air from source 22 to provide an air bearing 24 therebetween.

Stator 17 is provided with a reservoir 20 and a membrane 23 for retaining a fluid 25 such as freon therein. Membrane 23 is disposed to rupture at high (100+g) accelerations of missile 11 and reservoir 20 is also pressurized from source 22 to aid in forcing fluid 25 through passages 21 for increased bearing 24 capability in the period of high acceleration. Passages 27 are provided in rotor 19 to permit fluid 25 to escape and reduce viscous torques in bearing 24 subsequent to the high acceleration period. Compressed air continues to be supplied to bearing 24 when the liquid is exhausted.

In operation of missile 11 with axis 13 and rotor 19 axis directed in the path, air from passages 29 operates caging device 31 to free rotor 19. At the same time the air impinges on buckets 33 to rotate rotor 19 up to operating speed after which air in passages 29 is cut off to permit rotor 19 to coast during the remainder of the flight. Rotor 19 is provided with a projecting portion 35 to control the light from quadrature sources 37 that impinges on optical pickoffs 39. A predetermined area of pickoffs 39 is illuminated when stator 17 and rotor 19 are axially coincident and as the illuminated area changes when missile 11 rotates about center 41 of bearing 24 due to outside forces, signals from pickoffs 39 operate a steering mechanism with jets 43 corresponding to pickoffs 39 to return missile axis 13 to coincidence with the rotor 19 axis.

We claim:

1. In a transportation machine disposed for operation in a linear path, and provided with a gyroscope disposed for high initial acceleration to a predetermined rate of rotation and subsequent coasting therefrom comprising:

a stator and a rotor with a spherical bearing therebetween and with said stator secured in axial relation with said transportation machine and provided with passages to supply compressed air to said bearing; and a reservoir in communication with said passages, a fluid, and a membrane disposed to retain said fluid in said reservoir and to rupture for fluid displacement of the compressed air in said bearing responsive to a predetermined value of the initial acceleration;

said rotor including vents communicating with said bearing for escape of said fluid to minimize viscous drag during the coasting.

* * * * *